Oct. 11, 1960  J. W. RICHARDS  2,955,870
MOTOR VEHICLE FRONT END STRUCTURE
Filed Feb. 17, 1958  3 Sheets-Sheet 1

J. W. RICHARDS
INVENTOR.
BY E.C. McRae
J. R. Faulkner
J. H. Oster
ATTORNEYS

J. W. RICHARDS
INVENTOR.

BY

ATTORNEYS

Oct. 11, 1960    J. W. RICHARDS    2,955,870
MOTOR VEHICLE FRONT END STRUCTURE
Filed Feb. 17, 1958    3 Sheets-Sheet 3

J. W. RICHARDS
INVENTOR.

BY E. C. McRae
J. R. Faulkner
J. H. Oster

ATTORNEYS

United States Patent Office 2,955,870
Patented Oct. 11, 1960

2,955,870

MOTOR VEHICLE FRONT END STRUCTURE

Jesse W. Richards, Dearborn, Mich., assignor to Ford Motor Company, Dearborn, Mich., a corporation of Delaware Filed Feb. 17, 1958, Ser. No. 715,583

4 Claims. (Cl. 296—28)

This invention relates to motor vehicles and more particularly to a novel front end construction.

The invention utilizes a strut assembly which is capable of attachment to the forward portion of a motor vehicle body. The unit is constructed on a space frame principal from stamping stock which is shaped to form box channel sections open to the outside. The open box channels are covered on the side portions by the fender aprons which also span the area between the channels to give the unit greater rigidity and to provide the upper support for the suspension members. A reinforcement is welded to the upper and lower front box channel sections to complete the front structural support portion and a rear reinforcement is welded to the upper rear box channel section to complete the rear structural portion. The unit is independently rigid and effectively resists twisting and bending forces. Quick attachment means to the body are provided in the form of four bolts connecting the strut assembly through the lower support brackets and two bolts connecting the strut assembly through the upper support brackets. All front end components such as the suspension, engine and transmission, steering gear and linkage, radiator, and electrical units may be assembled to the front end unit prior to the assembly of the unit to the body. Finished sheet metal parts such as the fenders, hood, etc. are assembled to the unit after attachment to the body. Because of the integration of the body and front end unit, greater rigidity in the assembled body and front end unit is attained. The rigidity of the front end unit makes possible the placement of insulation between the unit and the body, thus effectively dampening or eliminating many front end noises and vibrations which are normally felt by the vehicle occupants. Body refinements and improvements can be made independent of the front end unit. Servicing of the front end components in whole or part is possible. The novel arrangement of the detail parts makes possible their manufacture from relatively thin sheet metal stock by mass production stamping and welding techniques. A substantial reduction in front end weight is attained without reducing front end rigidity and strength.

An object of the present invention is to provide a front end unit to which front end components may be assembled prior to the attachment of the unit to the vehicle body at final assembly.

Another object is to provide a bolt-on front end unit which will provide maximum structural strength and rigidity with a minimum of light-weight parts.

Still another object is to provide a sheet metal welded strut assembly of rigid construction to which front end components may be easily assembled and which is capable of quick and simple attachment to a vehicle body.

Still another object is to provide a quick attachment, independently rigid front end strut unit of a simple construction and easy to manufacture at relatively low cost.

Other objects and advantages of the present invention will become more apparent as this description proceeds, particularly when considered in connection with the accompanying drawings, in which.

Figure 1:
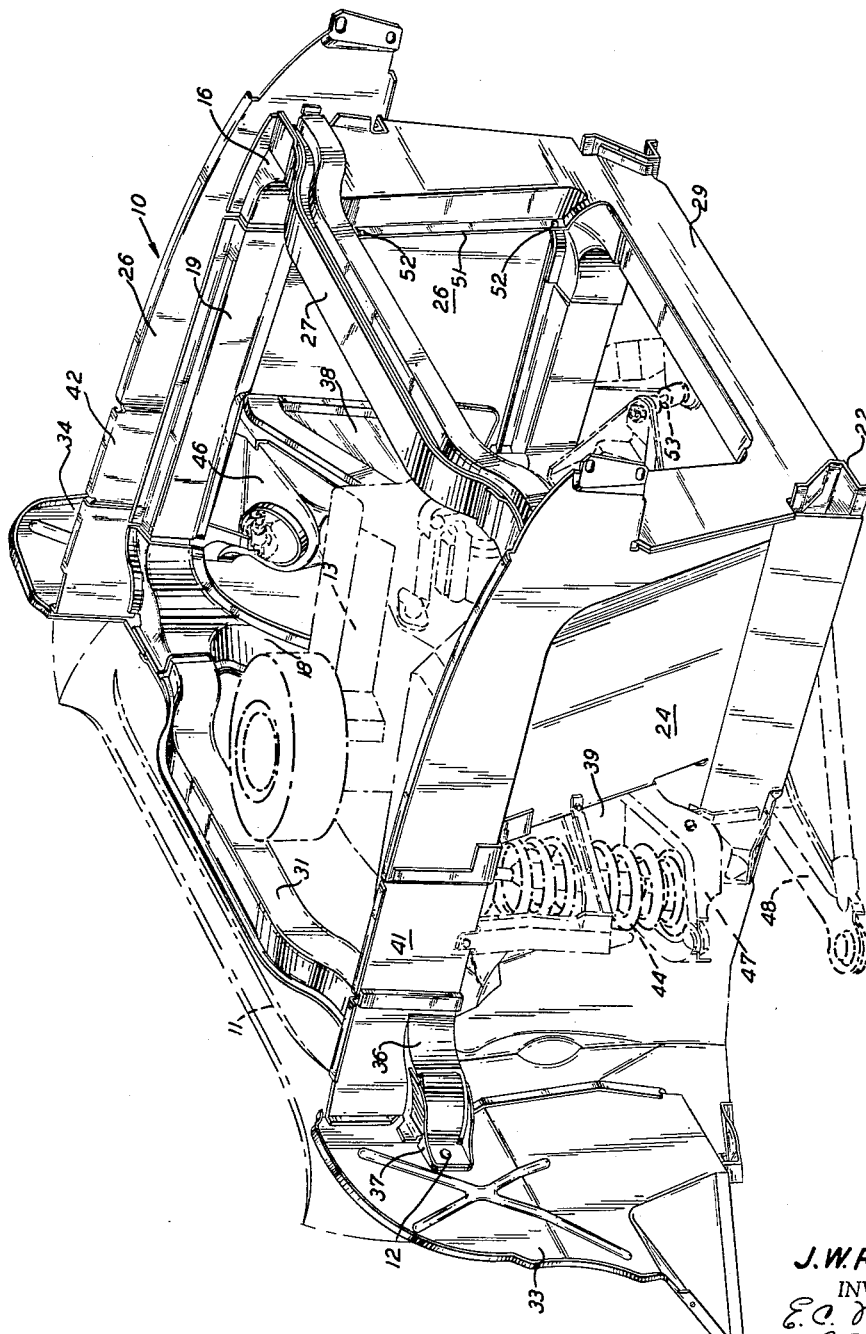
Figure 1 is a perspective view of the complete strut assembly secured to the cowl of a motor vehicle body and having the engine and portions of the front suspension units secured thereto.

Referring now to the drawings, reference numeral 10 indicates a space-frame strut assembly generally which is secured by a plurality of mounting bolts 12 to the cowl 11 (shown in part) of the vehicle body. An engine 13, shown in phantom, is housed within the strut assembly 10 and is secured by front engine mounting brackets 53 to the forward portion of the strut assembly 10. The rear mounting of the combined engine and transmission will be discussed in detail later.

Figure 2:
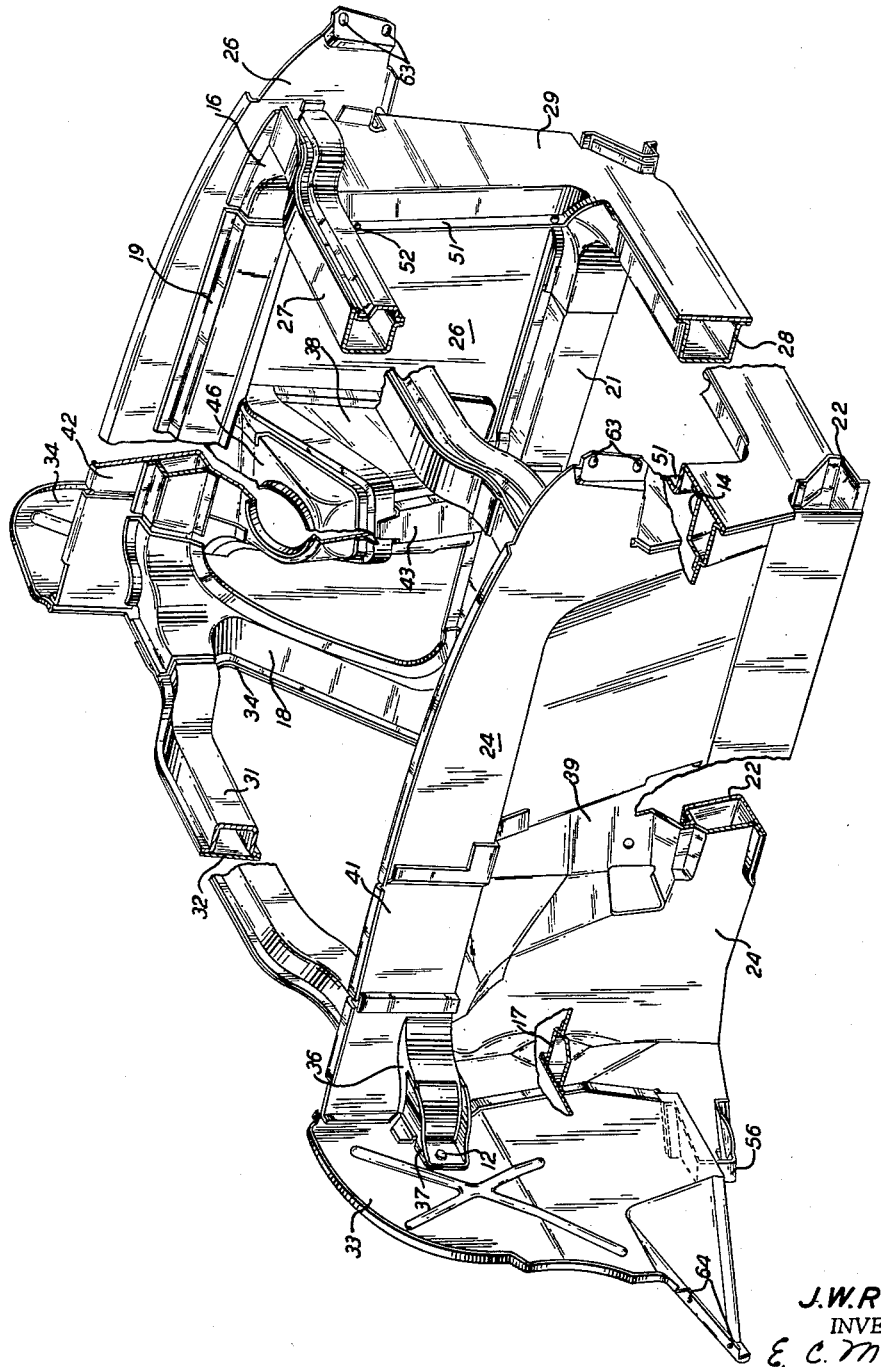
Figure 2 is a perspective view of the assembled strut assembly cutaway in part.

As can be seen particularly in Figure 2, the unit is fabricated from horizontal U shaped box channel sections open to the outside secured to vertical supports of only one-half of a box channel section. The box section of the supports is completed by welding the necessary reinforcements and side aprons.

Looking at the detail construction of the unit, it has four substantially vertical supports of which the front fender apron and radiator supports are shown at 14 and 16 and the rear fender apron supports at 17 and 18 respectively. Upper and lower frame side members 19 and 21 are weldably secured to the front and rear supports 16 and 18 respectively, on one side of the unit. On the opposite side of the unit, the upper frame side member (not shown), which is the same as the frame side member 19, and the lower frame side member 22 are weldably secured to the front and rear supports 14 and 17 respectively.

The sides of the unit are closed in by welding fender apron assemblies 24 and 26 to the vertical supports 14, 16, 17, and 18, and the upper and lower frame side members 19, 21, and 22 respectively. Fender apron assemblies 24 and 26 not only cover the open channel portions but also span the area between the channel sections. The spanning of this area provides greater structural support against bending and twisting by a thinner metal and also permits the mounting of some of the front suspension members. The two side sections are connected in the front by box channel upper and lower front fender and radiator cross support members 27 and 28 which are secured to the upper and lower portions of the vertical supports 14 and 16. A collar shaped front fender and radiator reinforcement 29 is weldably secured to the vertical supports 14 and 16, cross supports 27 and 28 and apron assemblies 24 and 26 to close in the vertical supports and complete the box channel sections in the front.

The rear attachment of the two sides is provided through the box channel upper rear cross member 31 and reinforcement 32 which closes the channel opening. Because of the extension of the engine and the transmission at the rear of the engine, a lower rear cross member is not utilized. The rear portion of the rear vertical supports 17 and 18 of the unit is completed by the welding of rear splash shields 33 and 34 to both of the vertical supports 17 and 18 and aprons 24 and 26 to complete the box sectioning of the rear vertical supports. Adjacent to the splash shields 33 and 34, the aprons 24 and 26 are outwardly embossed at 36 to provide a support for the upper strut mounting bracket 37 which is weldably secured to both the embossment 36 and the splash shields 33 and 34. The bracket and mounting is identical for both sides of the unit, hence only one bracket and embossment is shown in the drawings.

Inwardly of the box channel sections, the apron assemblies 24 and 26 are stamped to form suspension pockets 38 and 39 respectively. Suspension pocket supports 41 and 42 are weldably secured to the upper frame side member 19 and the apron 26 through appropriate overlapping flanges. Suspension bracket 43, of which only one is shown, is welded on the engine side of the apron to the pockets 38 and 39 and extends downwardly to form a pivot mounting for the lower wishbone 48. This mounting is not shown in the drawings.

The pockets 38 and 39 respectively, house the coil suspension spring and shock absorber 44 shown in phantom and of which only one installation is shown. The upper portion 46 of the pocket supports 41 and 42 provides the upper attachment portion for the spring and shock absorber 44, while the upper wishbone 47 provides the lower support for the spring and shock absorber.

The radiator may be conveniently attached to the radiator flange 51 of the front fender and radiator reinforcement 29 by means of bolts (not shown) through the apertures 52 provided in the flange.

The engine 13 may be mounted in the front to engine brackets 53 which can be conveniently bolted to the side members 21, 22, and support 28.

Figure 3:
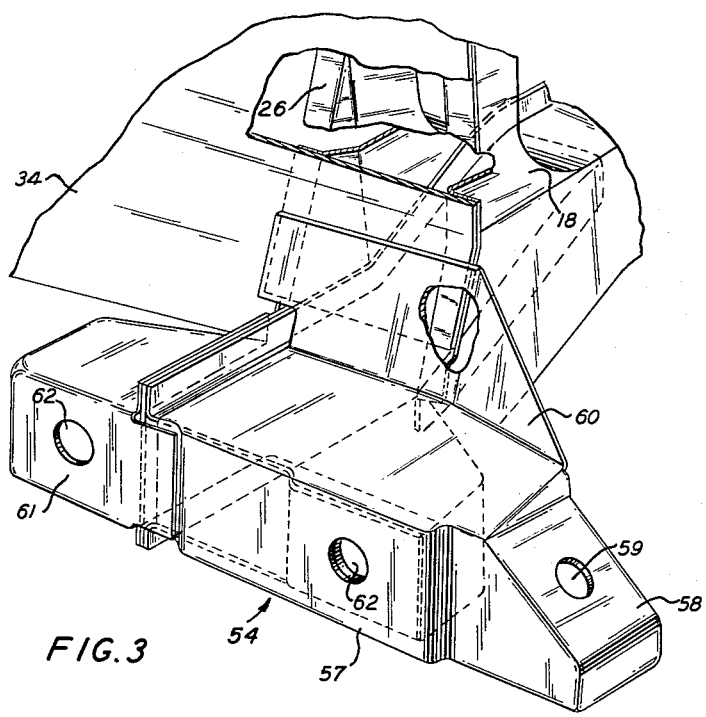
Figure 3 is an enlarged fragmentary perspective view partly cutaway of one of the rear lower mounting brackets; and, Figure 4 is a cutaway section through one of the suspension pockets.
Figure 4:
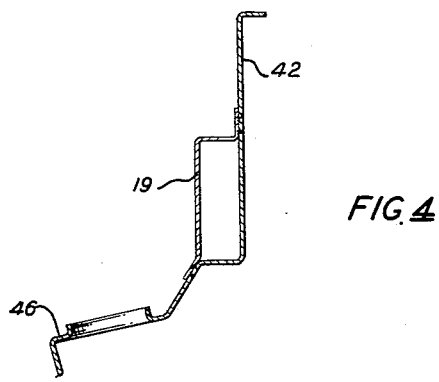

The rear attachment and mounting means for the combined engine and transmission is accomplished through a combined engine and body lower strut mounting bracket indicated generally at 54 (see Fig. 3) and 56 (see Fig. 2) and located rearwardly of the splash shields 33 and 34 and weldably secured to the lower frame side members 21 and 22 respectively. In Figure 3, it can be seen that the lower strut mounting bracket 54 is comprised of an outer and inner mounting bracket 57 and 61. An aperture 62 is provided in both brackets through which the strut mounting bolts 12 extend for mounting the lower portion of the unit to the cowl 11. Bracket 57 is provided with an angular mounting pad 58 and an aperture 59 for the purpose of attaching the rear mounts (not shown) of the combined transmission and engine to the unit by bolts (not shown). The brackets 57 and 61 are, of course, provided with appropriate flanges for weldably securing the brackets to the lower frame side support members 21 and rear vertical support 18 respectively.

Fenders (not shown) may be secured to appropriate mounting pads on the apron and splash shields respectively, by bolt means (not shown) extending through the apertures 63 and 64 in the aprons 24 and 26 and splash shields 33 and 34 respectively.

It will be understood that the invention is not to be limited to the exact construction shown and described, but that various changes and modifications may be made without departing from the spirit and scope of the invention, as defined in the appended claims.

What is claimed is:

1. An integral fabricated space frame strut for attachment to the front portion of a motor vehicle body and adapted to support the front end components of a motor vehicle; comprising in combination a pair of spaced apart box-section upper and lower longitudinally extending frame side rails, a pair of front and rear box-section vertical supports connected to the ends of each of the upper and lower frame side members, upper and lower box-section cross members, connecting the front vertical supports at a point adjacent to the upper and lower longitudinally extending frame side rails, a rear upper cross member connecting the rear vertical supports at a point adjacent to the upper longitudinally extending frame side rails, and bracket means on said rear vertical supports for securing said integral strut to the motor vehicle body cowl.

2. An integral fabricated space frame strut for attachment to the front portion of a motor vehicle body and adapted to support the front end components of a motor vehicle; comprising in combination a pair of spaced apart box-section upper and lower longitudinally extending frame side rails, a pair of front and rear box-section vertical supports connected to the ends of each of the upper and lower frame side members, upper and lower box-section cross members, connecting the front vertical supports at a point adjacent to the upper and lower longitudinally extending frame side rails, a rear upper cross member connecting the rear vertical supports at a point adjacent to the upper longitudinally extending frame side rails, a pair of fender aprons, each of said fender aprons being weldably secured to the front and rear vertical supports and to the upper and lower side rails forming respective sides of said space frame strut, each of said fender aprons between said vertical supports and said side rails being provided with an outwardly opening pocket structure adapted to receive a suspension spring unit, and bracket means on said rear vertical supports for securing said integral strut to the motor vehicle body cowl.

3. An integral fabricated space frame strut for attachment to the front portion of a motor vehicle body and adapted to support the front end components of a motor vehicle; comprising in combination a pair of spaced apart box-section upper and lower longitudinally extending frame side rails, a pair of front and rear box-section vertical supports connected to the ends of each of the upper and lower frame side members, upper and lower box-section cross members, connecting the front vertical supports at a point adjacent to the upper and lower longitudinally extending frame side rails, a rear upper cross member connecting the rear vertical supports at a point adjacent to the upper longitudinally extending frame side rails, flange means on said front vertical supports, arranged to support a motor vehicle radiator, and bracket means on said rear vertical supports for securing said integral strut to the motor vehicle body cowl.

4. A fabricated sheet metal strut for attachment to the front of a motor vehicle body comprising in combination, a pair of front and rear vertical supports having side portions comprising one-half of a box channel section, said side portions being disposed in back to back spaced apart relationship, upper and lower open channel shaped side rails weldably secured to the top and bottom of said front and rear vertical supports with their channel open to the outside, front upper and lower open channel shaped cross members weldably secured to the top and bottom of said front vertical supports with their channel open to the outside, a rear open channel shaped cross member weldably secured to the top of the rear vertical supports with its channel open to the outside, an open center radiator support weldably secured to the front cross members and the front vertical supports and closing the front cross members channels and a portion of the channel of the front vertical supports, a pair of fender aprons, each of said fender aprons weldably secured to one of the front and rear vertical supports and upper and lower side rails respectively, and spanning the area between said supports and rails and closing the open channels of the side rails, the front vertical supports, and a portion of the rear vertical supports, a rear reinforcement weldably secured to said rear open channel shaped cross member and closing said channel, a pair of splash shields, each one of said shields being weldably secured to one of the rear vertical supports and one of the fender aprons and extending outwardly of the apron and closing the channel in said rear vertical supports, and bracket means secured to said rear vertical supports and fender aprons for securing said strut to said motor vehicle body.

References Cited in the file of this patent

UNITED STATES PATENTS

| | | |
|---|---|---|
| 2,539,050 | Begg | Jan. 23, 1951 |
| 2,654,634 | Zummach | Oct. 6, 1953 |
| 2,705,660 | Giacosa | Apr. 5, 1955 |

FOREIGN PATENTS

| | | |
|---|---|---|
| 469,584 | Italy | Mar. 6, 1952 |
| 245,565 | Switzerland | Nov. 17, 1947 |

OTHER REFERENCES

"Coachwork Design," Weaver entry, in "Automobile Engineer" of July 1955, pages 281–283 and 285.